W. S. DEEDS.
Flexible Jointed Metallic Pipes for Railroad Cars.
No. 149,842. Patented April 21, 1874.

Witnesses
Thomas P. Bewley.
Isaac Rindge

Inventor
William S. Deeds
By His Attorney
Stephen Ustick

UNITED STATES PATENT OFFICE.

WILLIAM S. DEEDS, OF PHILADELPHIA, ASSIGNOR TO HIMSELF AND GEORGE H. DEEDS, OF WILKINSBURG, PENNSYLVANIA.

IMPROVEMENT IN FLEXIBLE-JOINTED METALLIC PIPES FOR RAILROAD-CARS.

Specification forming part of Letters Patent No. 149,842, dated April 21, 1874; application filed September 4, 1873.

*To all whom it may concern:*

Be it known that I, WILLIAM S. DEEDS, of the city of Philadelphia and State of Pennsylvania, have invented an Improvement in Combined Flexible Tube and Flexible-Jointed Pipes for Heating Railroad-Cars, &c., of which the following is a specification:

The object of my invention is the connecting hot-air pipes with a train of cars, in such a manner that the hot air shall be conveyed through a series of pipes with as little loss of heat as practicable, while the pipes shall have the requisite flexibility, so as to yield to any irregularity in the motions of each car in reference to the motions of the contiguous cars. To effect this object, I connect metallic pipes with a series of short jointed pipes at the adjacent ends of the cars, so constructed as to turn at the joints in adaptation to the cars running on curves, or to any change from a direct line, either vertically or laterally, in relation to each other. A portion of the heat naturally escapes from the joints of the pipes. To direct this heat into the cars, I combine a tube, made of india-rubber or other suitable material, with the metallic short jointed pipes, surrounding the latter by them, leaving an annular space between the tube and pipes, through which the heat passes to the cars, the metallic pipes being held centrally within the surrounding tubes, so that the heat of the former will not injure the latter, by means of duplicate rings and connecting-rods, which hold the inner and outer rings against the outer surface of the pipes and the inner surface of the tubes, respectively, as hereinafter fully described.

Figure 1:
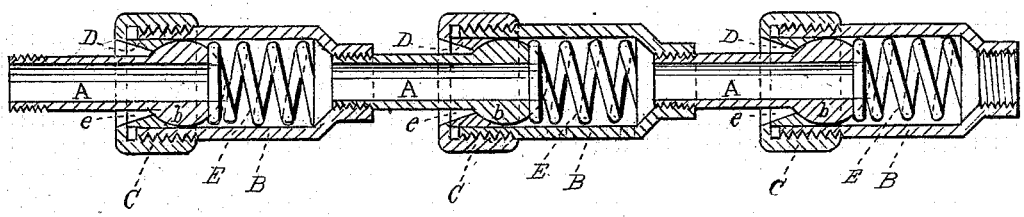
Figure 2:
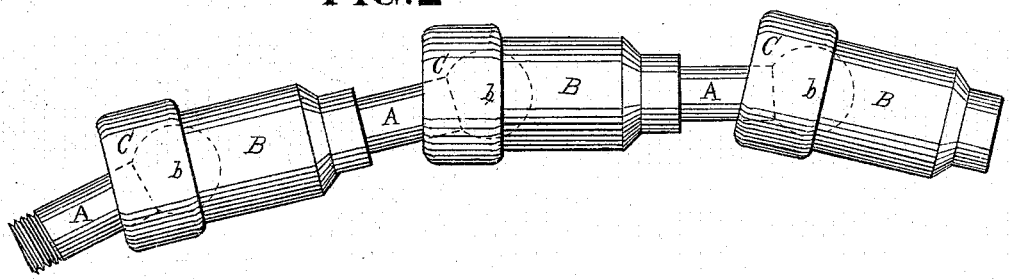
Figure 3:
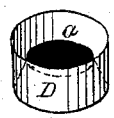
Figure 4:
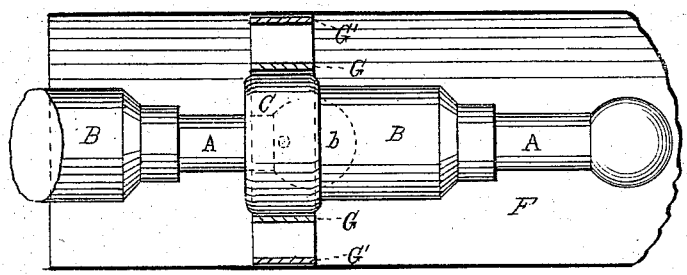
Figure 5:
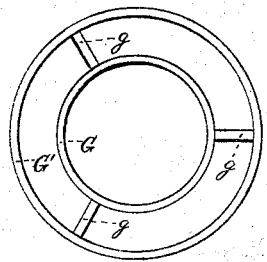

Figure 1 is a longitudinal section of three joints of short pipes, connected together by means of ball-and-cylinder joints. Fig. 2 is a plan view of the same, representing their flexibility. Fig. 3 is an isometrical view of the ring D. Fig. 4 is a longitudinal section of a portion of the combined tube F and flexible-jointed pipes A B. Fig. 5 is an end view of the enveloping-tube F and double ring G and G'.

Like letters of reference in all the figures indicate the same parts.

A A A are short pipes, of equal bore throughout, having at one end a ball, *b*. B B B are cylinders, connected with the other end of the pipes A by means of screw-threads. These cylinders are enlarged at their connection with the pipes A, and have a cylindrical bore to the other end, of the diameter of the balls *b* of the pipes A. C C C are rings, which connect with the large ends of the pipes B by means of screw-threads, as seen in Fig. 1. D D D are packing-rings, having conical seats *a* for the balls *b*. The rings are made of lead or other soft metal, so that the steam or compressed air, when the pipes are filled therewith, forces the balls into the seats sufficiently tight to prevent leakage. At other times, the balls are held in their seats tight enough, by means of the wire springs E E, to hold the chain of pipes well together. The packing-rings D and the plates of the rings C have a conical enlargement, as shown, at the points *e*, Fig. 1, to admit of the combined pipe being bent, as shown in Fig. 2, thus giving complete flexibility thereto, to adapt it to the cars turning curves, or to unequal heights of contiguous cars. The flexible joints are only required at the ends of the cars. I therefore connect with them straight pipes, which run the main length of the cars. F is a large exterior or enveloping tube, made of flexible material, and combined with the flexible-jointed metallic pipes, so that the annular space between the tube and pipes A B is made to open into the cars at their ends, to conduct into them whatever heat may escape from said pipes, their length corresponding to the sections of the latter, so as to give but little strain upon them. To prevent the contact of the enveloping-tube with the flexible pipes A B, as seen in Fig. 4, the double rings G and G' are connected together by means of rods *g*, and the outer rings, G', are confined to the enveloping-tube F by means of rivets. In connecting the rings G and D with the cylinder B, the large ring is secured on the end of the cylinder, the shell of which passes between the rings in the space $f$, as seen in Fig. 1.

I claim as my invention—

1. The combination and arrangement of the flexible tube F and double ring G and G' with a series of flexible-jointed pipes, A B, substantially in the manner and for the purpose above described.

2. The combination of the flexible tube F, series of flexible-jointed metallic pipes A B, centrally arranged therein, and the double rings G and G', substantially in the manner and for the purpose above described.

WILLIAM S. DEEDS.

Witnesses:
  THOMAS J. BEWLEY,
  STEPHEN USTICK.